(12) United States Patent
Liu et al.

(10) Patent No.: US 7,509,299 B2
(45) Date of Patent: Mar. 24, 2009

(54) CALCULATING WEB PAGE IMPORTANCE BASED ON A CONDITIONAL MARKOV RANDOM WALK

(75) Inventors: Tie-Yan Liu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 11/375,611

(22) Filed: Mar. 13, 2006

(65) Prior Publication Data

US 2007/0214108 A1 Sep. 13, 2007

(51) Int. Cl.
*G06F 15/00* (2006.01)
*G06F 15/18* (2006.01)

(52) U.S. Cl. ...................................................... 706/62
(58) Field of Classification Search ........................ None
See application file for complete search history.

(56) References Cited

OTHER PUBLICATIONS

'PageRank, HITS and a Unified Framework for Link Analysis': Ding, 2002, LBNL Tech Report 49372.*
'The PageRank Citation Ranking: Bringing order to the Web': Pagerank, Jan. 29, 2998.*
G.H. Golub and C.F. Van Loan, "Chapter 7—The Unsymmetric Eigenvalue Problem," Matrix computations, Johns Hopkins Univ. Press 1996, pp. 308-390.
Amento, Brian, Loren Terveen and Will Hill, "Does 'Authority' Mean Quality? Predicting Expert Quality Ratings of Web Documents," SIGIR 2000, Athens, Greece, © 2000 ACM, pp. 296-303.
Brin, Sergey and Lawrence Page, "The Anatomy of a Large-Scale Hypertextual Web Search Engine," Proceedings of WWW Conference 1998, 20 pages.
Feng, Guang et al., "Level-Based Link Analysis," Proceedings of the Seventh Asia Pacific Web Conference, 2005, 12 pages.
Haveliwala, Taher H., "Topic-Sensitive PageRank: A Context-Sensitive Ranking Algorithm for Web Search," Dec. 15, 2002, WWW 2002, © 2003 IEEE, 22 pages.
Kamvar, Sepandar D. et al., "Exploiting the Block Structure of the Web for Computing PageRank," 2003 Stanford University Technical Report, 13 pages.
Kleinberg, Jon M., "Authoritative Sources in a Hyperlinked Environment," Journal of the ACM, vol. 46, No. 5, 1999, 34 pages.
Lempel, R. and S. Moran, "The stochastic approach for link-structure analysis (SALSA) and the TKC effect," WWW Computer Networks 2000, COMPNW2288 / WWW 175, © 2000 Published by Elsevier Science B.V., pp. 1-15.

(Continued)

*Primary Examiner*—David R Vincent
*Assistant Examiner*—Peter Coughlan
(74) *Attorney, Agent, or Firm*—Perkins Coie LLP

(57) ABSTRACT

An importance system calculates the importance of pages using a conditional Markov random walk model rather than a conventional Markov random walk model. The importance system calculates the importance of pages factoring in the importance of sites that contain those pages. The importance system may factor in the importance of sites based on the strength of the correlation of the importance of a page to the importance of a site. The strength of the correlation may be based upon the depth of the page within the site. The importance system may iteratively calculate the importance of the pages using "conditional" transition probabilities. During each iteration, the importance system may recalculate the conditional transition probabilities based on the importance of sites that are derived from the recalculated importance of pages during the iteration.

21 Claims, 9 Drawing Sheets

OTHER PUBLICATIONS

Miller, Joel C., Gregory Rae and Fred Schaefer, "Modifications of Kleinberg's HITS Algorithm Using Matrix Exponentiation and Web Log Records," SIGIR'01, New Orleans, © 2001 ACM, pp. 444-445.

Page, L. et al., "The PageRank Citation Ranking: Bringing Order to the Web," Jan. 29, 1998, Stanford University Technical Report, pp. 1-17.

Richardson, Matthew and Pedro Domingos, "The Intelligent Surfer: Probabilistic Combination of Link and Content Information in PageRank," Advances in Neural Information Processing Systems, 2002, vol. 14, pp. 1441-1448.

Robertson, S.E., "Overview of the Okapi Projects," Journal of Documentation, vol. 53, No. 1, Jan. 1997, pp. 3-7.

* cited by examiner

CALCULATING WEB PAGE IMPORTANCE BASED ON A CONDITIONAL MARKOV RANDOM WALK

BACKGROUND

Using a search engine service, such as Google and Overture, a user may attempt to locate display pages, such as web pages, that may be of interest to the user. After the user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on various metrics such as the term frequency and inverse document frequency metric ("tf*idf"). The search engine service may also generate an importance score to indicate the importance of the web page based on various metrics such as Google's PageRank metric. The search engine service then displays to the user links to those web pages in an order that is based on a ranking determined by their relevance and importance.

Two well-known techniques for determining the importance of web pages are PageRank and HITS ("Hyperlink-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i \quad (1)$$

This equation can be solved by iterative calculations based on the following equation:

$$A^T w = w \quad (2)$$

where w is the vector of importance scores for the web pages and is the principal eigenvector of $A^T$. PageRank is based on a Markov random walk model in which a user randomly selects links from one page to another page.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q) \quad (3)$$

where a(p) represents the authority score for web page p and h(p) represents the hub score for web page p. HITS uses an adjacency matrix A to represent the links. The adjacency matrix is represented by the following equation:

$$b_{ij} \begin{cases} 1 & \text{if page } i \text{ has a link to page } j \\ 0 & \text{otherwise} \end{cases} \quad (4)$$

The vectors a and h correspond to the authority and hub scores, respectively, of all web pages in the set and can be represented by the following equations:

$$a = A^T h \text{ and } h = Aa \quad (5)$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j. HITS is also based on a Markov random walk model.

A Markov random walk model is, however, not an accurate representation of how users surf the web. In particular, users do not randomly select links to web pages. Rather, users select links based on anchor text, content relevance, and quality of the destination page. As a result, destination pages that are of high quality or that are described effectively by anchor text may have a probability of being transitioned to that is higher than a random probability.

SUMMARY

A method and system for calculating importance of web pages of a web site based on importance of web sites is provided. An importance system calculates the importance of the pages using a conditional Markov random walk model rather than a conventional Markov random walk model. The importance system calculates the importance of pages factoring in the importance of sites that contain those pages. The importance system may factor in the importance of sites based on the strength of correlation of the importance of a page to the importance of a site. The strength of the correlation may be based upon the depth of the page within the site. The importance system may iteratively calculate the importance of the pages using "conditional" transition probabilities. During each iteration, the importance system may recalculate the conditional transition probabilities based on the importance of sites that are derived from the recalculated importance of pages during the iteration. The importance system uses a model for transitioning between pages that represents the transitioning of a typical user more accurately than a random model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for calculating importance of web pages of a web site based on importance of web sites is provided. In one embodiment, an importance system calculates the importance of the pages using a conditional Markov random walk model rather than a conventional Markov random walk model. A conditional Markov random walk model adjusts the random probability of a user selecting a link of a page based on some condition, such as anchor text, content relevance, destination page quality, site importance, and so on. In one embodiment, the importance system calculates the importance of pages factoring in the importance of sites that contain those pages. The use of the importance of sites in determining the importance of pages is based on the assumption that users are more likely to select links to pages of important sites. The importance system may calculate the importance of a page using a conventional importance algorithm such as PageRank or HITS by modifying the transition probabilities to factor in the importance of the sites. The importance system may factor in the importance of sites based on the strength of correlation of the importance of a page to the importance of a site. The strength of the correlation may be based upon the depth of the page within the site. In particular, pages that are deeper within the hierarchy of a site may be less closely correlated to the importance of the site than pages near the top of the hierarchy. In addition, the importance system may calculate the importance of a site based on the importance of pages of the site. For example, the importance system may calculate the importance of the site to be a normalized sum of the importance of the pages of a site. The importance system may calculate the importance of pages by iteratively calculating importance based on transition probabilities that are derived from the importance of sites, referred to as "conditional transition probabilities." During each iteration, the importance system may recalculate the conditional transition probabilities based on the importance of sites that are derived from the recalculated importance of pages during the iteration. Alternatively, the importance system may initially calculate the conditional transition probabilities based on site importance and use those conditional transition probabilities during each iteration without recalculation. The importance system may also recalculate conditional transition probabilities after a certain number of iterations. In this way, the importance system uses a model for transitioning between pages that represents the transitioning of a typical user more accurately than a random model.

Figure 1:
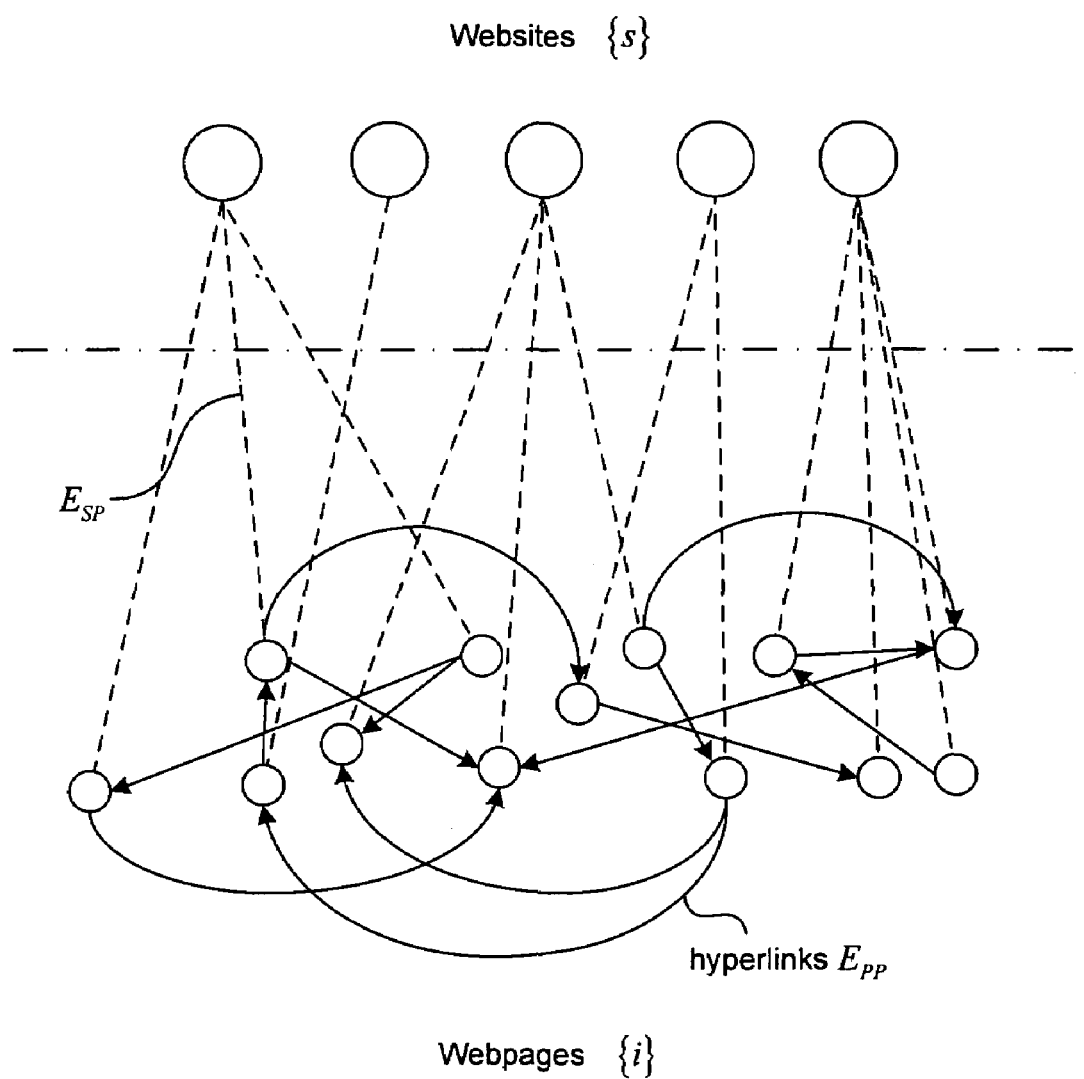
FIG. 1 is a diagram that illustrates a web graph of web sites and their web pages.

FIG. 1 is a diagram that illustrates a web graph of web sites and their web pages. The large circles represent web sites, and the small circles represent web pages within the web sites. The dashed lines indicate the web pages that are contained within each web site, and the solid lines with arrows indicate links from one web page to another web page. The importance system may represent the web graph by the following equation:

$$G^* = <V_P, V_S, E_{PP}, E_{SP}> \quad (6)$$

where $V_P = \{i | i=1,2, \ldots, n\}$ are vertices representing web pages, $V_S = \{s | s=1,2, \ldots, m\}$ are hidden vertices representing web sites, $E_{PP} = \{<i,j> | i,j \in V_P\}$ are edges representing links between web pages, and $E_{SP} = \{<s,i> | s \in V_S, i \in V_P\}$ are edges representing the correlation of web pages to their web sites. If web page i is in web site s, then $<s,i> \in E_{SP}$. The importance system represents the strength of the correlation of web page i to its web site s as $e_{s,i}$.

In one embodiment, the importance system defines the conditional transition probability for a conditional Markov random walk model based on the transition probabilities based on a conventional Markov random walk model. The importance system defines the conditional transition probabilities based on the strength of the correlation of a page to the importance of its site and the importance of the site itself. The importance system may represent the conditional transition probability by the following equation:

$$p(i \to j | s(j)) = \frac{f(i \to j | s(j))}{\sum_k f(i \to k | s(k))} \quad (7)$$

where $p(i \to j | s(j))$ is the conditional probability of transitioning from page i to page j when page j is in site s(j), k represents a page in site s(j), and $f(i \to | s(j))$ represents the frequency corresponding to the probability under a Markov random walk model of transitioning from page i to page j adjusted by the strength of the correlation of the importance of the site to the importance of the page and by the importance of the site. The importance system represents the frequency by the following equation:

$$f(i \to j | s(j)) = p(i \to j) \cdot e_{s(j),j} \cdot \sum_{<s,(j)k> \in E_{SP}} \pi_k \quad (8)$$

where $p(i \to j)$ represents the transition probability under a conventional Markov random walk model of transitioning from page i to page j, $e_{s(j),j}$ represents the strength of the correlation of page j of site s(j), and $\pi_k$ represents the importance of page k to site s(j). The importance vector, which contains the importance of each page, is represented as $\pi$.

In one embodiment, the importance system calculates the strength of the correlation of a page to a site based on the depth of the page within the site. The importance system may calculate the depth of a page based on a reference to the page such as a uniform resource locator ("URL"). For example, the page identified by the URL "www.uspto.gov/news/index.html" may have a level of three, whereas the page identified by the URL "www.uspto.gov" may have a level of one. A technique for identifying the level of the page is described in Feng, G., Liu, T., Zhang, X., Qin, T., Gao, B., and Ma, W., "Level-Based Link Analysis," APWeb, 183-194, 2005. The importance system may represent the strength of the correlation by the following equation:

$$e_{s(j),j} = \frac{l_j^{-\theta}}{\sum_{<s(j),k> \in E_{SP}} l_k^{-\theta}} \quad (9)$$

where $e_{s(j),j}$ represents the strength of the correlation of page j of site s(j), $<s(j),k>$ represents page k of site s(j), $l_k$ represents the level of page k, and $\theta$ represents a tunable parameter. When the tunable parameter is greater than 0, then the strength is a non-increasing function of depth. If the tunable parameter is set to 0, then the strength is the same for all pages of a site. The importance system may alternatively calculate the strength of the correlation using various linear and non-linear scoring metrics.

In one embodiment, the importance system uses a PageRank-type algorithm to iteratively calculate the importance of pages based on the importance of sites. In particular, the importance system replaces the adjacency matrix A of Equation 2, which corresponds to a transition probability matrix, with matrix C, which corresponds to a conditional transition probability matrix. The importance system represents matrix C by the following equation:

$$C(i,j) = p(i \rightarrow j | s(j)) \quad (10)$$

The importance system calculates the importance of the pages by iteratively performing Equation 2 During each iteration, the importance system may recalculate the conditional transition probability matrix C because the importance of a site has changed based on the changes in the importance of the pages of the site. For example, the importance system may initialize the importance vector indicating the initial importance of each page using a technique such as PageRank or HITS. The importance system then generates the conditional transition probability matrix C using the importance vector. The importance system then calculates a new importance vector as represented by the following equation:

$$\pi^m = C^T \pi^{m-1} \quad (11)$$

where $\pi^{m-1}$ represents the importance vector of the previous iteration. After calculating the new importance vector, the importance system recalculates the conditional transition probability matrix C using the new importance vector during the next iteration.

In one embodiment, the importance system may skip the recalculation of the conditional transition probability matrix during the iterations because of the computational overhead of such recalculations. The importance system may use the initial conditional transition probability matrix C that is generated as described above. Alternatively, the importance system may initialize the importance vector as represented by the following equation:

$$\pi_k = \sum_m p(m \rightarrow k) \pi_k \approx \sum_m p(m \rightarrow k) \quad (12)$$

Figure 2:
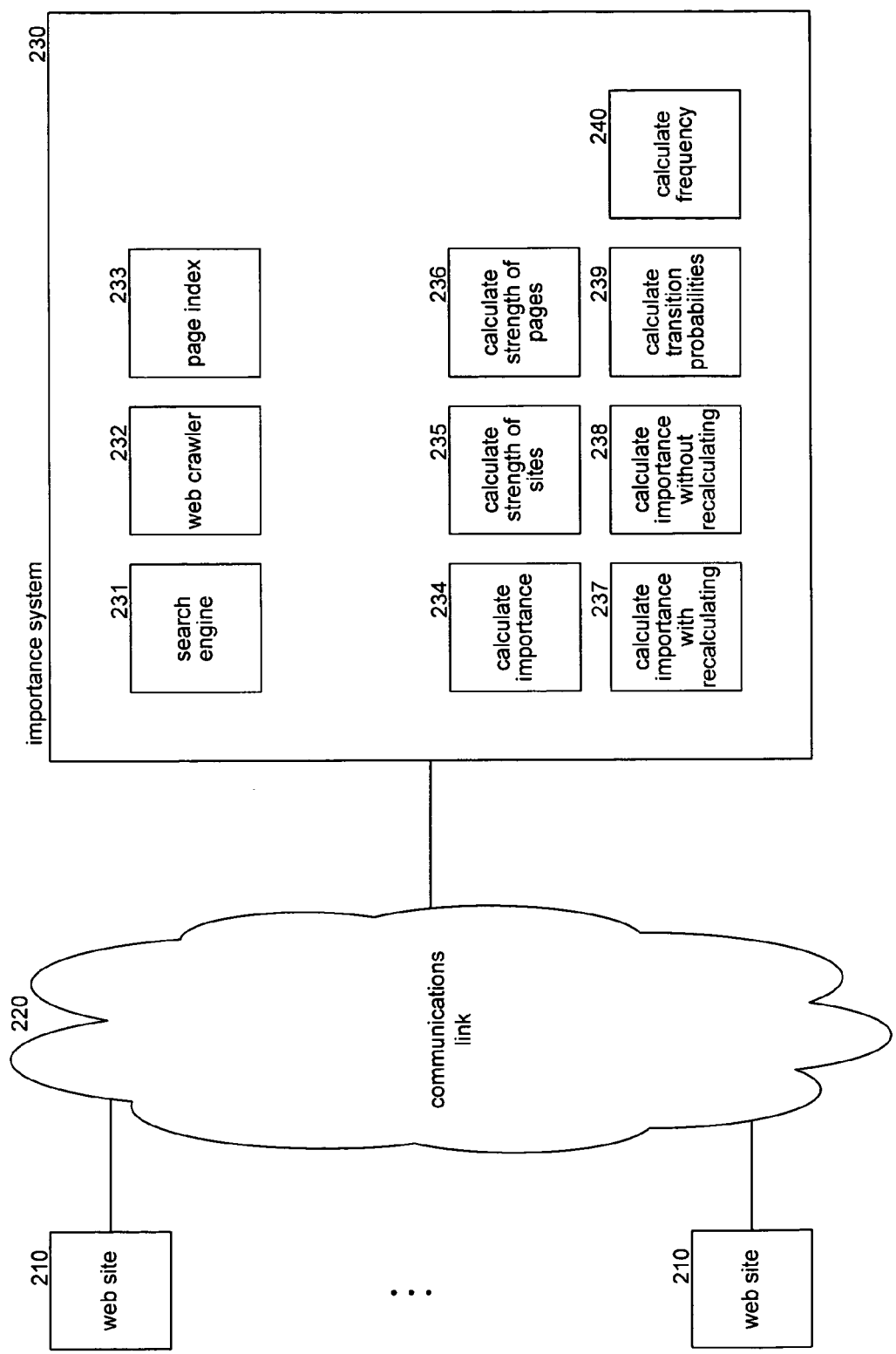
FIG. 2 is a block diagram that illustrates components of the importance system in one embodiment.

FIG. 2 is a block diagram that illustrates components of the importance system in one embodiment. The importance system 230 is connected via communications link 220 to web sites 210. The importance system may include a search engine component 231, a web crawler component 232, and a page index store 233. The search engine component and the web crawler component may be conventional components of a search engine service. The page index store contains indexes to web pages crawled by the web crawler component. The importance system also includes a calculate importance component 234, a calculate strength of sites component 235, a calculate strength of pages component 236, a calculate importance with recalculation component 237, a calculate importance without recalculation component 238, a calculate transition probabilities component 239, and a calculate frequency component 240. The search engine component may invoke the calculate importance component to calculate the importance of pages of a search result. The calculate importance component invokes the calculate strength of sites component to calculate the strength of pages within sites by invoking the calculate strength of pages component. The calculate importance component also invokes the calculate importance with recalculation or without recalculation components to perform the iterative calculation of importance. These components in turn invoke the calculate transition probabilities component and calculate frequency component to generate the conditional transition probability matrix.

The computing devices on which the importance system is implemented may include a central processing unit, memory, input devices (e.g., keyboard and pointing devices), output devices (e.g., display devices), and storage devices (e.g., disk drives). The memory and storage devices are computer-readable media that may contain instructions that implement the importance system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the importance system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on.

The importance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
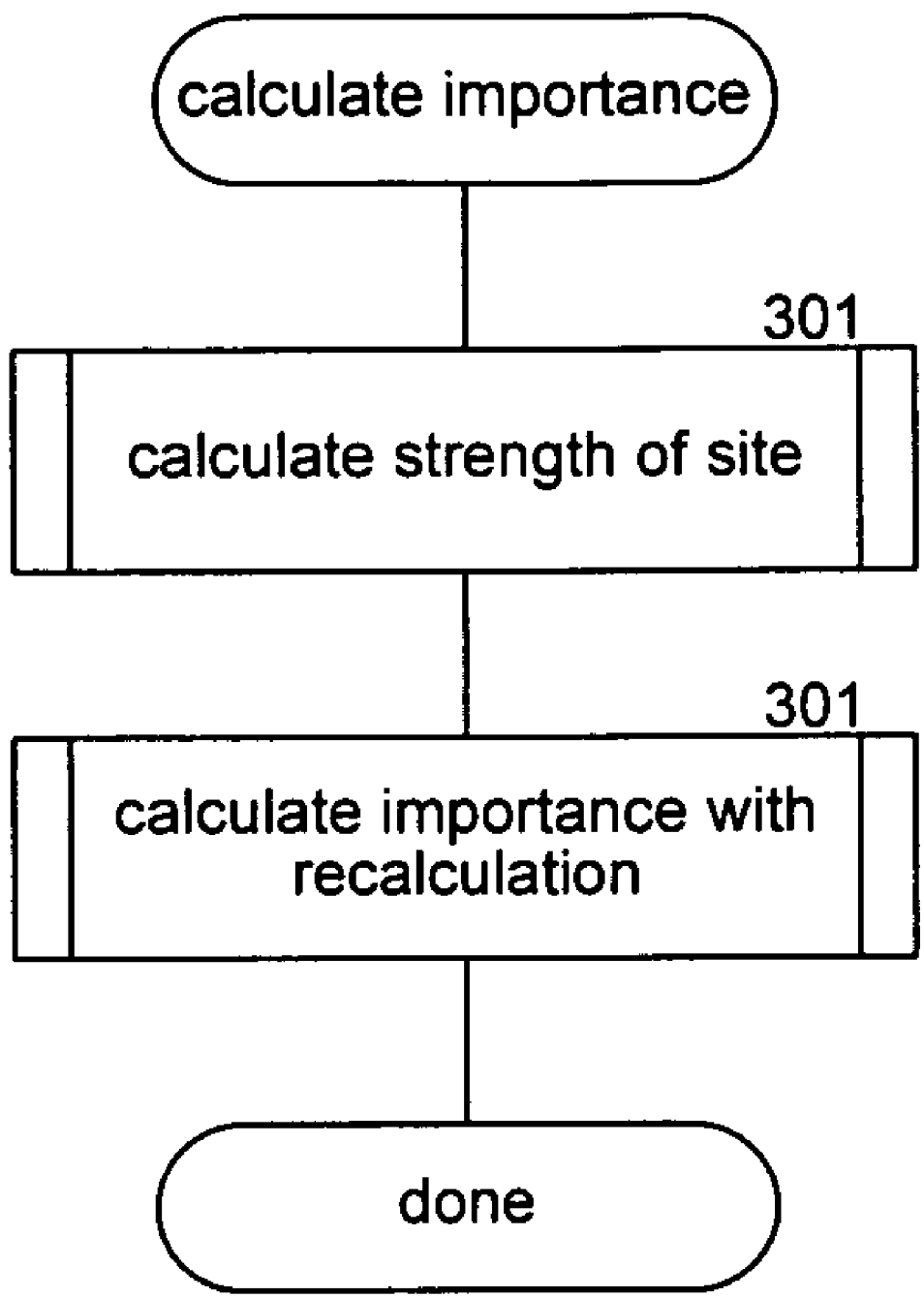
FIG. 3 is a flow diagram that illustrates the processing of the calculate importance component of the importance system in one embodiment.

FIG. 3 is a flow diagram that illustrates the processing of the calculate importance component of the importance system in one embodiment. In block 301, the component invokes the calculate strength of sites component to calculate the strength of the correlation of each page to the importance of its site. In block 302, the component invokes the calculate importance with recalculation component to iteratively calculate the importance of the pages and then completes.

Figure 4:
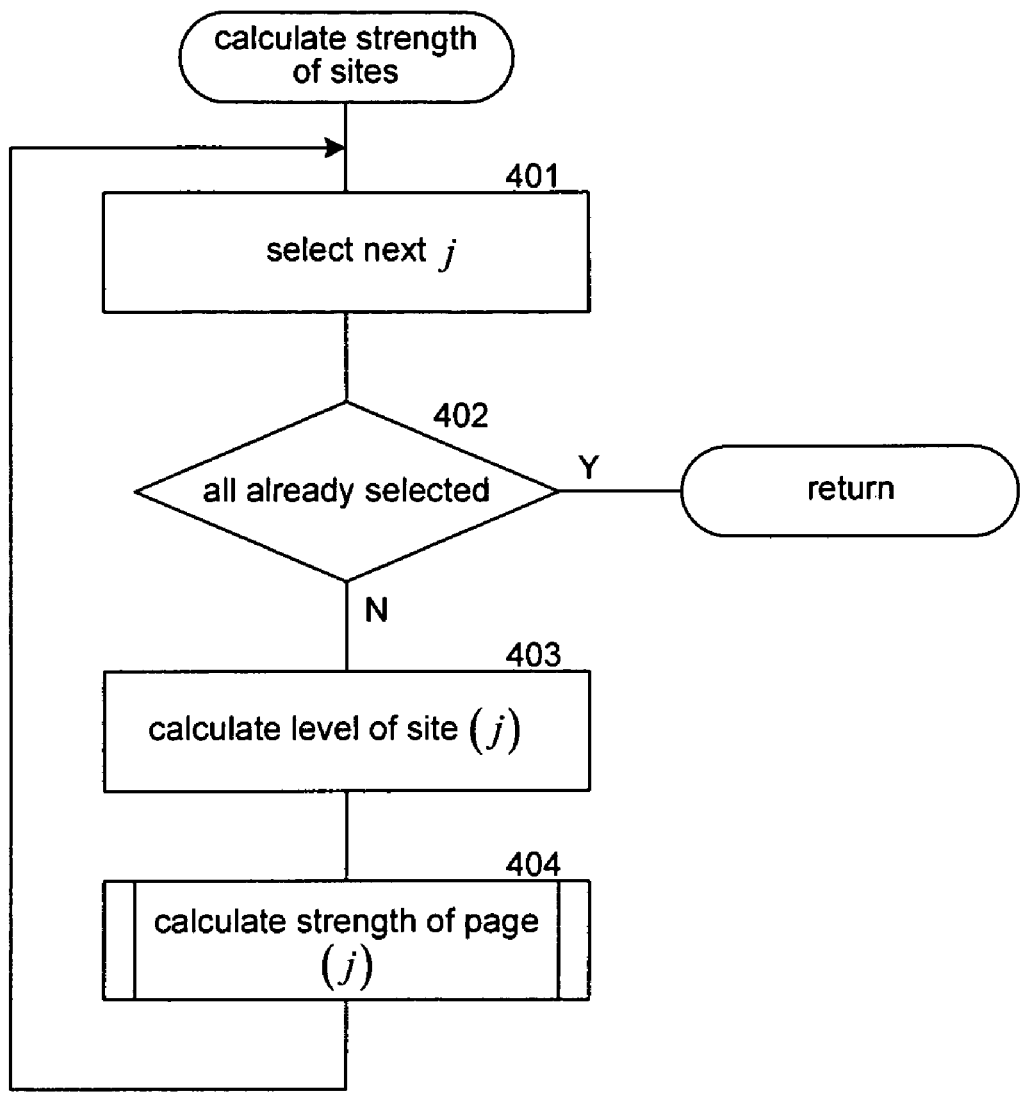
FIG. 4 is a flow diagram that illustrates the processing of the calculate strength of sites component of the importance system in one embodiment.

FIG. 4 is a flow diagram that illustrates the processing of the calculate strength of sites component of the importance system in one embodiment. The component calculates the strength of correlation of the pages of each site. In block 401, the component selects the next site. In decision block 402, if all the sites have already been selected, then the component returns, else the component continues at block 403. In block 403, the component calculates the levels of the pages within the selected site. In block 404, the component invokes the calculate strength of pages component passing the selected site to calculate the strength of the correlation of the pages within the site. The component then loops to block 401 to select the next site.

Figure 5:
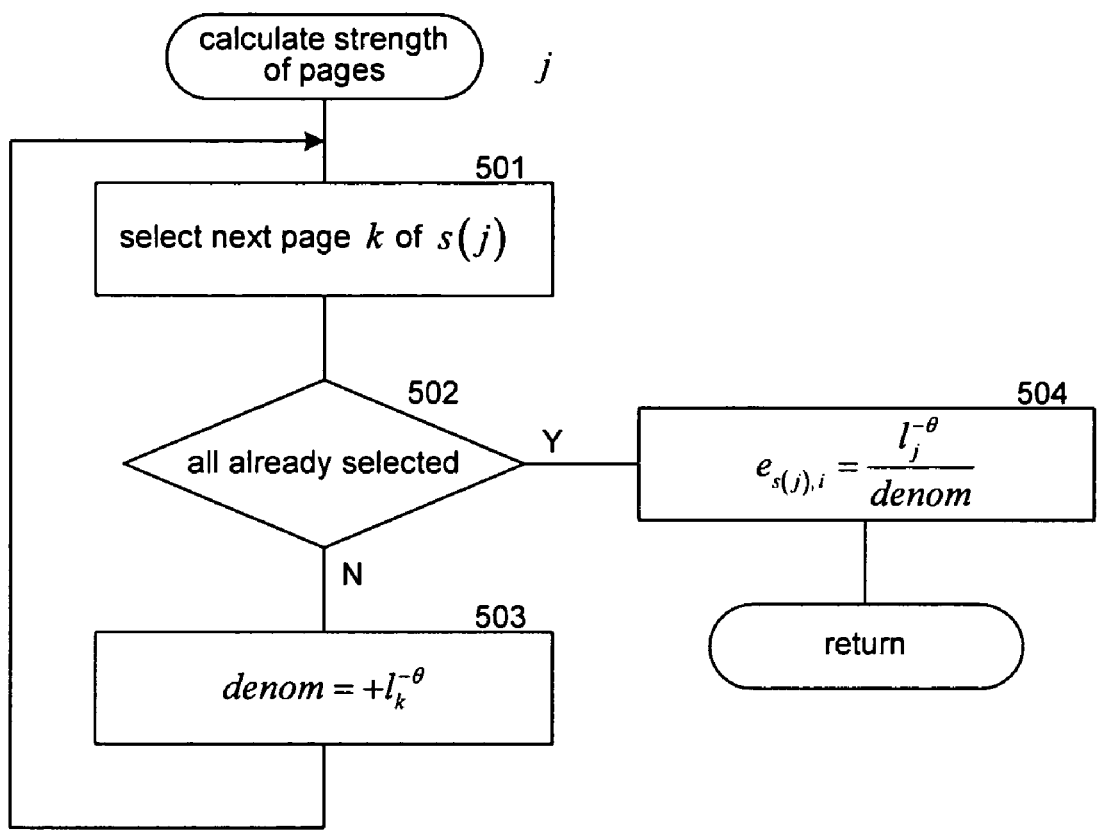
FIG. 5 is a flow diagram that illustrates the processing of the calculate strength of pages component of the importance system in one embodiment.

FIG. 5 is a flow diagram that illustrates the processing of the calculate strength of pages component of the importance system in one embodiment. The component is passed a site and calculates the strength of the pages within that site. In block 501, the component selects the next page of the passed site. In decision block 502, if all the pages have already been selected, then the component continues at block 504, else the component continues at block 503. In block 503, the component calculates the denominator for Equation 9 and loops to block 501 to select the next page. In block 504, the component calculates the strength of each page of the passed site using the calculated denominator. The component then returns.

Figure 6:
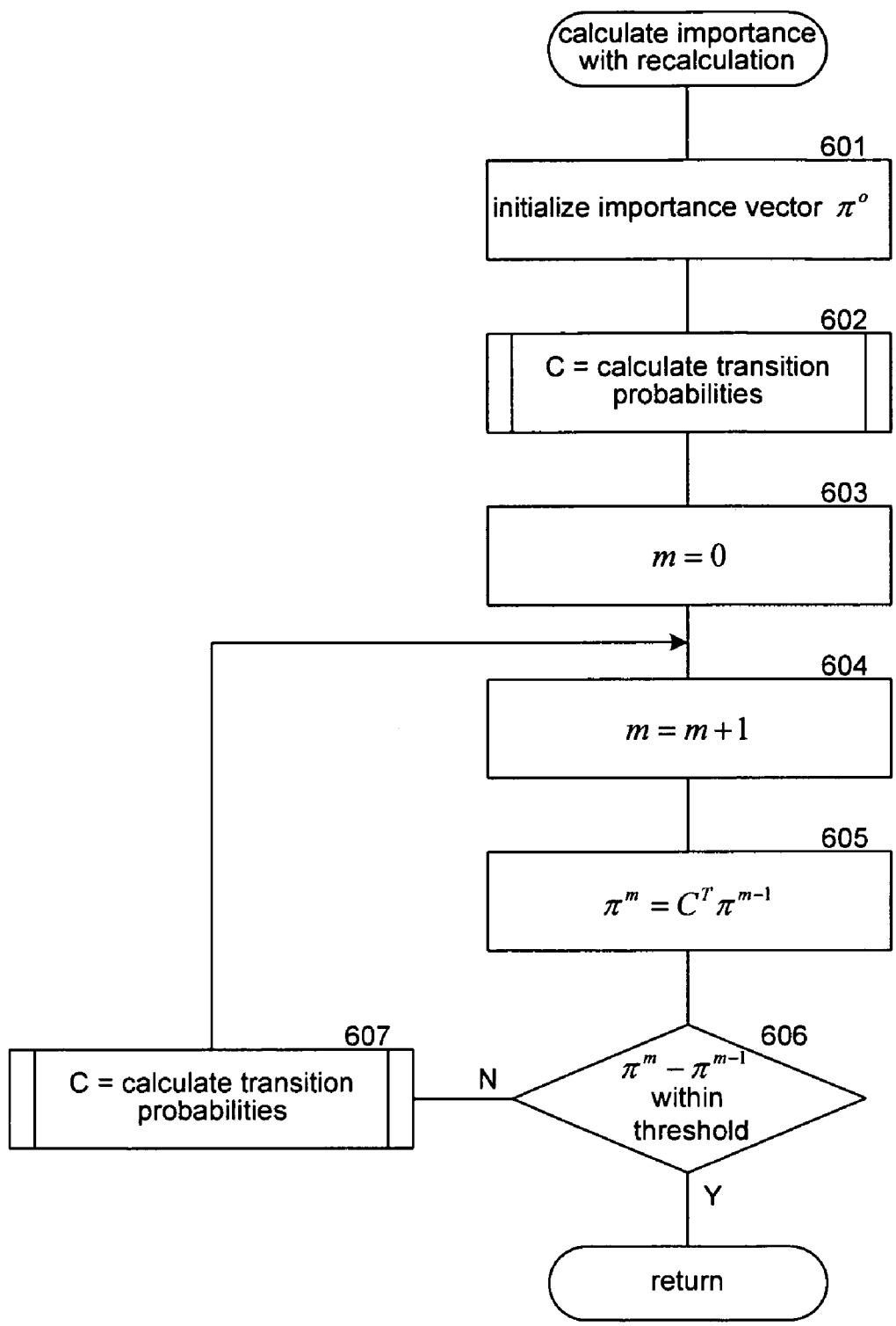
FIG. 6 is a flow diagram that illustrates the processing of the calculate importance with recalculation component of the importance system in one embodiment.

FIG. 6 is a flow diagram that illustrates the processing of the calculate importance with recalculation component of the importance system in one embodiment. In block 601, the component initializes the importance vector. In block 602, the component invokes the calculate transition probabilities component to establish the conditional transition probabilities based on the importance vector. In block 603, the component initializes the iteration count. In blocks 604-607, the component loops performing each iteration. In block 604, the component increments the iteration count. In block 605, the component calculates a new importance vector based on the conditional transition probability matrix. In decision block 606, if the new importance vector is within a threshold amount of the previous importance vector or some other termination criterion, then the component has converged on a solution and returns, else the component continues at block 607. In block 607, the component invokes the calculate transition probabilities component to recalculate the conditional transition probabilities based on the new importance vector. The component then loops to block 604 to start the next iteration.

Figure 7:
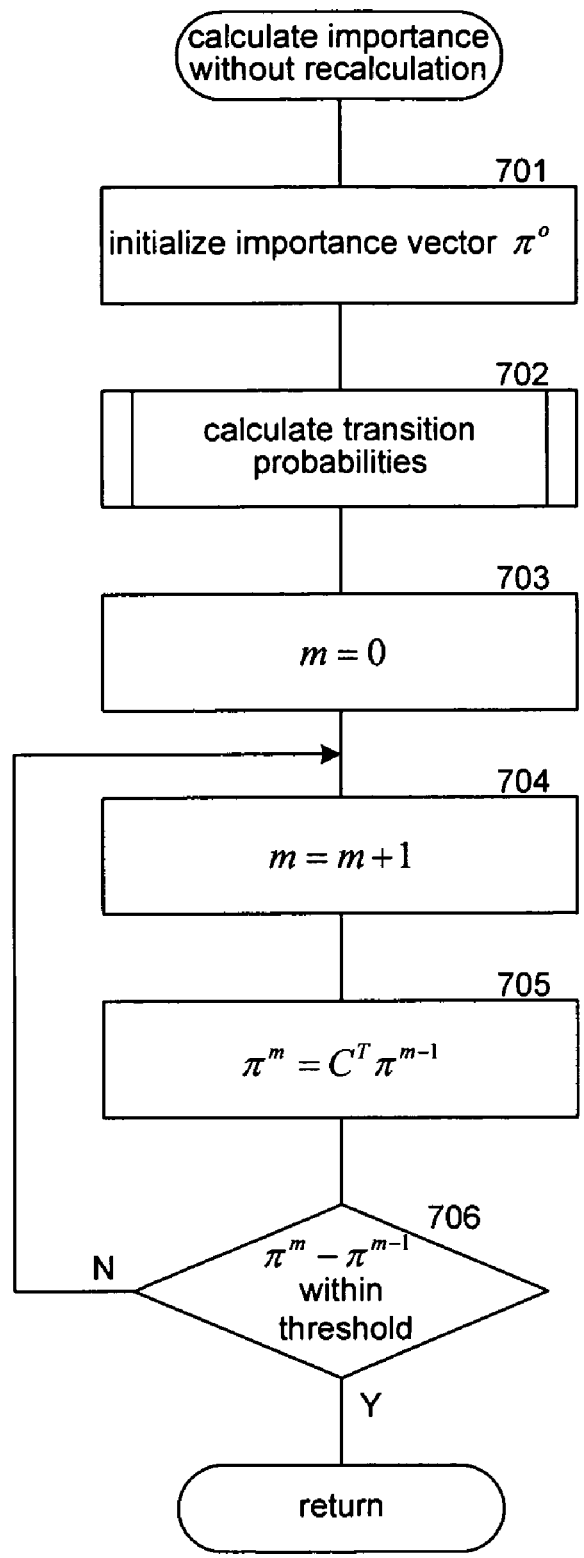
FIG. 7 is a flow diagram that illustrates the processing of the calculate importance without recalculation component of the importance system in one embodiment.

FIG. 7 is a flow diagram that illustrates the processing of the calculate importance without recalculation component of the importance system in one embodiment. The processing of this component is similar to that of the calculate importance with recalculation component except that no recalculation of the conditional transition probability matrix is performed during each iteration. As such, FIG. 7 is similar to FIG. 6 except that there is no block corresponding to block 607, which recalculates the conditional transition probability matrix.

Figure 8:
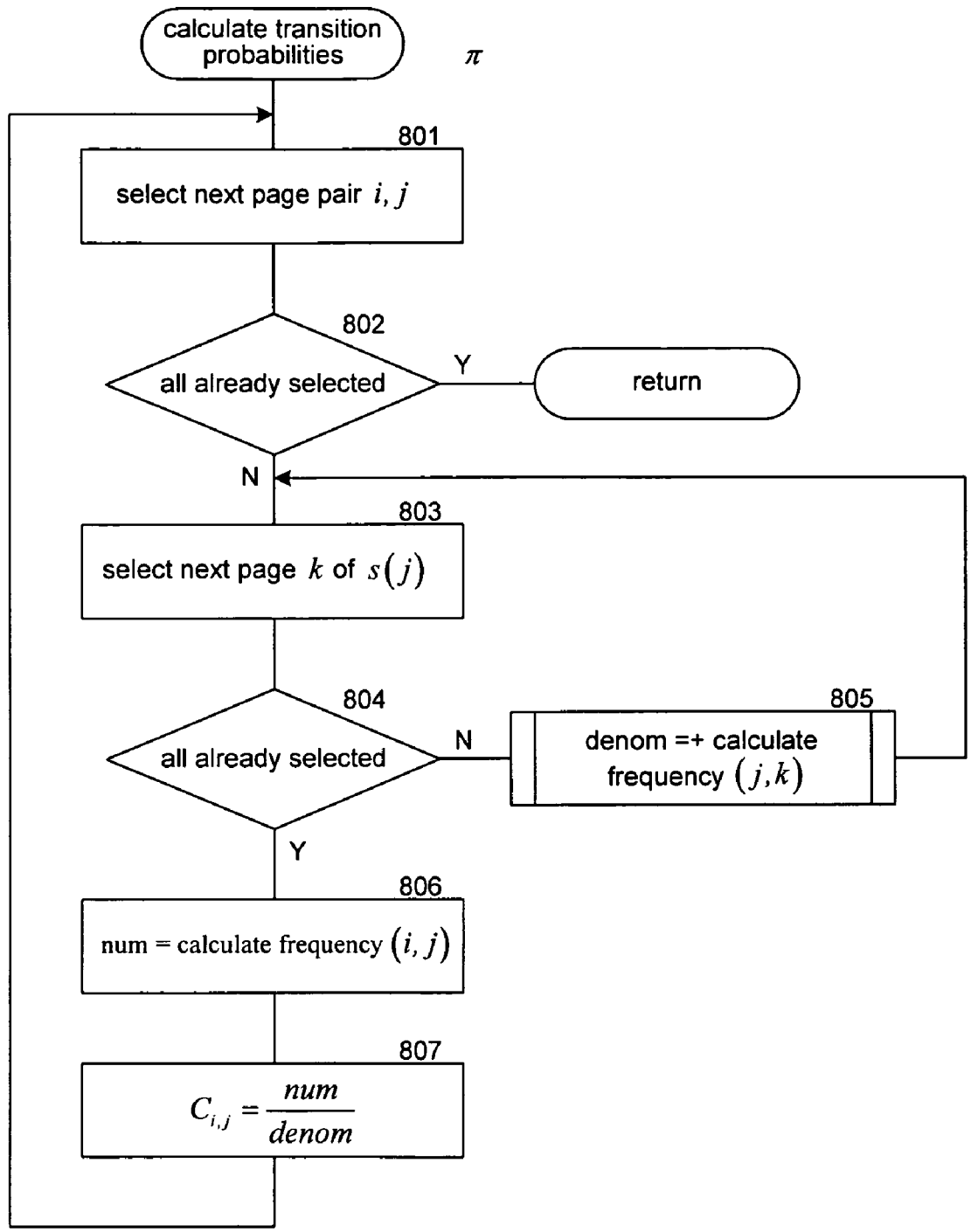
FIG. 8 is a flow diagram that illustrates the processing of the calculate transition probabilities component of the importance system in one embodiment.

FIG. 8 is a flow diagram that illustrates the processing of the calculate transition probabilities component of the importance system in one embodiment. The component is passed an importance vector and calculates the conditional transition probabilities for pairs of pages based on importance of sites as determined from the importance vector. In block 801, the component selects the next pair of pages. In decision block 802, if all the pairs of pages have already been selected, then the component returns, else the component continues at block 803. In blocks 803-805, the component loops calculating the denominator for Equation 7. In block 803, the component selects the next page of the site of the destination page of the pair of pages. In decision block 804, if all the pages of the site have already been selected, then the component continues at block 806, else the component continues at block 805. In block 805, the component invokes the calculate frequency component passing the destination page and the selected page to calculate the pair's frequency. The component then accumulates that frequency into a denominator. The component then loops to block 803 to select the next page. In block 806, the component invokes the calculate frequency component passing the pair of pages to calculate the frequency for the numerator of Equation 7. In block 807, the component calculates the conditional transition probability for the pair of pages and then loops to block 801 to select the next pair of pages.

Figure 9:
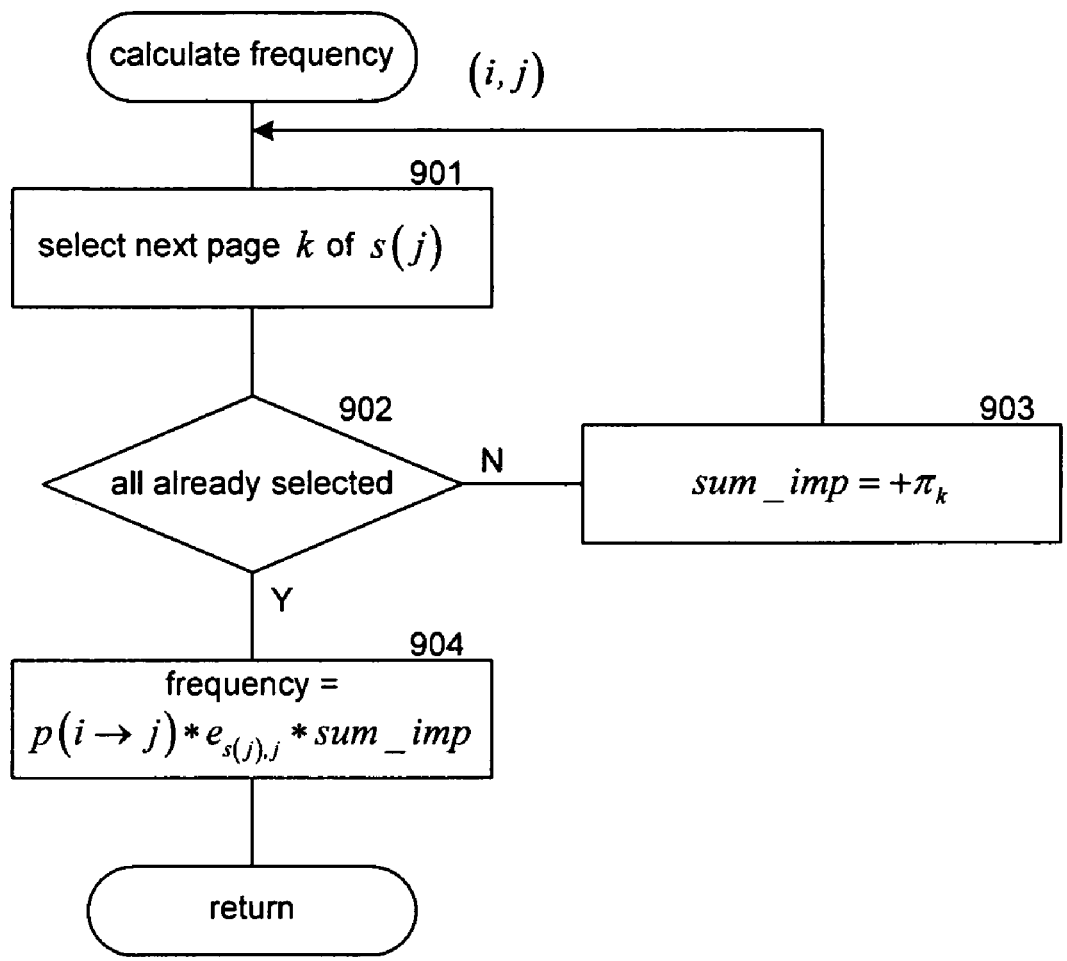
FIG. 9 is a flow diagram that illustrates the processing of the calculate frequency component of the importance system in one embodiment.

FIG. 9 is a flow diagram that illustrates the processing of the calculate frequency component of the importance system in one embodiment. The component is passed a pair of pages and calculates its frequency as defined by Equation 8. In block 901, the component selects the next page of the site of the destination page. In decision block 902, if all such pages have already been selected, then the component continues at block 904, else the component continues at block 903. In block 903, the component sums the importance of the pages of the site and then loops to block 901 to select the next page of the site. In block 904, the component calculates the frequency and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer system for calculating importance of pages, comprising:
    a data store that contains references to each page; and
    a processor that performs the processing of a calculate importance component that calculates the importance of pages factoring in importance of sites that contain the pages and importance of linked-to pages
    wherein the transition probability is represented by the following equation:

$$p(i \rightarrow j \mid s(j)) = \frac{f(i \rightarrow j \mid s(j))}{\sum_k f(i \rightarrow k \mid s(k))}$$

where $p(i \rightarrow f \mid s(f))$ is the conditional probability of transitioning from page i to page f when page j is in site $s(j)$, k represents a page in site $s(j)$, and $f(i \rightarrow j \mid s(f))$ represents the frequency corresponding to the probability under a random surfer model of transitioning from page i to page j adjusted by a correlation of the importance of the site to the importance of the page and by the importance of the site.

2. The computer system of claim 1 wherein the importance of a site to the importance of a page of the site decreases as the level of the page increases within the site.

3. The computer system of claim 1 wherein the calculate importance component includes a correlation component that calculates a correlation between the importance of a site and importance of a page of the site, wherein the correlation is used to calculate the importance of the page.

4. The computer system of claim 1 wherein the importance of a site is derived from the importance of the pages of the site.

5. The computer system of claim 1 wherein the calculate importance component calculates importance of pages based on a transition probability from one page to another page that is based on the importance of the site of the other page.

6. The computer system of claim 1 wherein the calculate importance component includes an iteration component that iteratively calculates the importance of the pages until the importance converges on a solution.

7. The computer system of claim 6 wherein transition probabilities are recalculated during the iterations based on recalculated importance of sites.

8. The computer system of claim 6 wherein transition probabilities are not recalculated during the iterations.

9. The computer system of claim 1 wherein the calculate importance component calculates importance based on a PageRank-type algorithm.

10. The computer system of claim 1 wherein the calculate importance component calculates importance based on a HITS-type algorithm.

11. The computer system of claim 1 wherein the frequency is represented by the following equation:

$$f(i \to j \mid s(j)) = p(i \to j) \cdot e_{s(j),j} \cdot \sum_{<s(j),k> \in E_{SP}} \pi_k$$

where $p(i \to j)$ represents the probability under a Markov random walk model of transitioning from page i to page j, $e_{s(j),j}$ represents the strength of correlation of page j to site s(j), {s(i),k} represents a page k of site s(j), and $\pi_k$ represents the importance of page k of site s(j).

12. A computer system for calculating importance of pages comprising:
a data store that contains references to each page; and
a processor that performs the processing of a calculate importance component that calculates the importance of pages factoring in importance of sites that contain the pages and importance of linked-to pages
wherein the calculates importance component includes a correlation component that calculates a correlation between the importance of a site and importance of a page of a site, wherein the correlation is used to calculate the importance of the page and
wherein the correlation is represented by the following equation:

$$e_{s(j),j} = \frac{l_j^{-\theta}}{\sum_{<s(j),k> \in E_{SP}} l_k^{-\theta}},$$

where $e_{s(j),j}$ represents the correlation of page j of site s(j), {s(j),k} represents a page k of site s(j), $l_k$ represents the level of page k, and θ represents a tunable parameter.

13. A computer system for calculating importance of pages comprising:
a data store that contains references to each page; and
a processor that performs the processing of a calculate importance component that calculates the importance of pages factoring in importance of sites that contain the pages and importance of linked-to pages
wherein the importance of a site is derived from the importance of the pages of the site and
wherein the importance of a site is represented by the following equation:

$$\pi_{s(j)} = \sum_{<s(j),k> \in E_{SP}} \pi_k$$

where $\pi_{s(j)}$ represents the importance of site s(f), s(j) represents the site of page j, $E_{SR}$ represents page k of site s(f), and $\pi_k$ represents the importance of page k.

14. The computer system of claim 13 wherein the transition probability is represented by the following equation:

$$p(i \to j \mid s(j)) = \frac{f(i \to j \mid s(j))}{\sum_k f(i \to k \mid s(k))}$$

where $p(i \to j \mid s(j))$ is the conditional probability of transitioning from page i to page j when page j is in site s(j), k represents a page in site s(j), and $f(i \to j \mid s(j))$ represents the frequency corresponding to the probability under a random surfer model of transitioning from page i to page j adjusted by a correlation of the importance of the site to the importance of the page and by the importance of the site.

15. The computer system of claim 14 wherein the frequency is represented by the following equation:

$$f(i \to j \mid s(j)) = p(i \to j) \cdot e_{s(j),j} \cdot \sum_{<s(j),k> \in E_{SP}} \pi_k$$

where $p(i \to j)$ represents the probability under a Markov random walk model of transitioning from page i to page j, $e_{s(j),j}$ represents the strength of correlation of page j to site s(j), {s(i),k} represents a page k of site s(j), and $\pi_k$ represents the importance of page k of site s(j).

16. A computer implemented method for calculating importance of pages, the computer implemented method comprising:
providing references to each page stored in a data store of a computer;
calculating by a processor of the computer the importance of pages using a PageRank-type algorithm with a transition probabilities adjusted to factor in the importance of sites that contain the pages
wherein the importance of a site is derived from the importance of the pages of the site and
wherein the importance of a site is represented by the following equation:

$$\pi_{s(j)} = \sum_{<s(j),k> \in E_{SP}} \pi_k$$

where $\pi_{s(j)}$ represents the importance of site s(f), s(j) represents the site of page j, $E_{SR}$ represents page k of site s(j), and $\pi_k$ represents the importance of page k.

17. The method of claim 16 wherein the transition probabilities are re-calculated during iterations of the algorithm.

18. The method of claim 16 wherein the transition probabilities are not re-calculated during the iterations of the algorithm.

19. The method of claim 16 wherein the importance of a page is based on a correlation between the importance of a site and importance of a page of the site and the importance of the site.

20. The method of claim 19 wherein the importance of a site is derived from the importance of pages of the site.

21. A computer readable storage medium containing instructions for controlling a computer system to calculate importance of pages, the computer system including a processor, by a computer implemented method comprising:
   calculating by the processor transition probabilities between pages based on the importance of a site that contains the destination page; and
   iteratively calculating by the processor the importance of pages based on the transition probabilities wherein the calculating of importance includes calculating a correlation between the importance of a site and importance of a page of the site, wherein the correlation is used to calculate the importance of a page and wherein the correlation is represented by the following equation:

$$e_{s(j),j} = \frac{l_j^{-\theta}}{\sum\limits_{<s(j),k> \in E_{SP}} l_k^{-\theta}},$$

where $e_{s(j),j}$ represents the correlation of page f of site s(j), {s(j),k} represents a page k of site s(j), $l_k$ represents the level of page k, and θ represents a tunable parameter.

* * * * *